United States Patent
Weh et al.

[11] Patent Number: 6,035,894
[45] Date of Patent: Mar. 14, 2000

[54] COUPLING DEVICE FOR RAPID CONNECTION

[75] Inventors: Wolfgang Weh; Erwin Weh, both of Illertissen, Germany

[73] Assignee: Weh GmbH Verbindungstechnik, Illertissen, Germany

[21] Appl. No.: 09/230,830

[22] PCT Filed: Jul. 30, 1997

[86] PCT No.: PCT/EP97/04133

§ 371 Date: Jan. 29, 1999

§ 102(e) Date: Jan. 29, 1999

[87] PCT Pub. No.: WO98/04866

PCT Pub. Date: Feb. 5, 1998

[30] Foreign Application Priority Data

Jul. 30, 1996 [DE] Germany ................ 296 12 942 U

[51] Int. Cl.[7] .................................................. E03B 65/20
[52] U.S. Cl. ............................ 137/614.06; 137/614.05
[58] Field of Search .......................... 137/614.05, 614.06

[56] References Cited

U.S. PATENT DOCUMENTS

| | | | |
|---|---|---|---|
| 3,731,705 | 5/1973 | Butler | 137/614.06 |
| 4,074,698 | 2/1978 | Hobson et al. | 137/614.06 |
| 4,222,411 | 9/1980 | Herzan et al. | 137/614.04 |
| 4,303,098 | 12/1981 | Shindelar | 137/614.06 |
| 4,347,870 | 9/1982 | Maldavs | 137/614.05 |
| 4,373,551 | 2/1983 | Shindelar | 137/614.06 |
| 5,095,947 | 3/1992 | Weh et al. | |

*Primary Examiner*—Kevin Shaver
*Assistant Examiner*—David A. Bonderer
*Attorney, Agent, or Firm*—Knobbe, Martens, Olson & Bear LLP

[57] ABSTRACT

A rapid connection coupling for transferring gaseous and/or liquid fluids includes a tubular housing, an outer sliding sleeve and a plurality of locking elements. The outer sliding sleeve is slidably mounted relative to the housing and the locking elements are attached to the housing and movable radially. The locking elements have an engagement profile for connection to a correspondingly formed connection nipple. A sealing piston is centrally slidable in the housing for engagement on the connection nipple, and a spring-biased ring piston is axially displaceable in the housing. The spring piston holds the sealing piston in a retracted position and is displaceably seated relative to the sealing piston.

19 Claims, 2 Drawing Sheets

COUPLING DEVICE FOR RAPID CONNECTION

FIELD OF THE INVENTION

The invention relates to a rapid connection coupling for transferring gaseous and/or liquid fluids, especially for filling vehicle fuel tanks.

A reliable, tight and rapidly connected plug-in coupling should be effected with such rapid connection couplings for transferring a fluid from a pressure source, for example a refill cylinder. Simple, problem-free operation of the rapid connection coupling is particularly important, so that problem-free handling is facilitated even under unfavourable conditions, such as dangerous fluids or at high connection pressures.

BACKGROUND OF THE INVENTION

Such a rapid connection coupling is described in EP-A 0 340 879 of the applicant, wherein the rapid connection coupling has a housing with a fluid inlet and a fluid outlet, while a plurality of valves are provided in order to ensure reliable sealing of the rapid connection coupling right up to complete production of the connection. These valves are operated in a specific, predetermined sequence after fitting of the rapid connection coupling by turning control lever, wherein the outlet valve is opened at first by pushing the rapid connection coupling on to a connection nipple, then with further movement of a control lever, the jaws serving as locking elements are closed and finally the inlet valve is opened. The control lever engages via an eccentric shaft with the sliding sleeve for actuating the jaws and also with a sealing piston, which also opens up the fluid inlet after completed connection of the plug-in coupling.

Although this provides a particularly reliable connection facility, the connection of this coupling is relatively force-consumptive for large opening sections (e. g. on bus refuelling) in account of the arresting of the check valve against an actuation spring, where in addition to plugging in the coupling, actuation of the control lever is necessary, so that one-handed operation is hardly possible.

Such a rapid connector is further known from WO-A 93/20378 of the applicant, especially for charging of gas cylinders, wherein a rapid connection arrangement is provided in the region of the outlet, in the form of jaws with an engagement profile. A hollow sealing piston sliding in the coupling housing is also described here and is connected through an actuating device coupled to a sliding sleeve for closing or opening the jaws. Putting on the coupling under axial pressure ("pressing on") is also necessary here, whilst due to residual pressure, a reaction may occur on uncoupling.

Accordingly the invention is based on the object of providing a rapid connection coupling of the kind initially described which facilitates reliable and especially simple handling with a simple structure.

SUMMARY OF THE INVENTION

An aspect of the invention involves a rapid connection coupling for transferring gaseous and/or liquid fluids. The coupling includes a tubular housing, an outer sliding sleeve and a plurality of locking elements. The outer sliding sleeve is slidably mounted relative to the housing and the locking elements are attached to the housing and movable radially. The locking elements have an engagement profile for connection to a correspondingly formed connection nipple. A sealing piston is centrally slidable in the housing for engagement on the connection nipple, and a spring-biased ring piston is axially displaceable in the housing. The spring piston holds the sealing piston in a retracted position and is displaceably seated relative to the sealing piston. Preferred developments of the invention are the subject matter of the dependent claims.

The proposed rapid connection coupling is distinguished by an especially simple operation, since the rapid connection coupling may be put on without force and released without reaction, respectively, from the counter-connection in axial direction. In addition, especially in the preferred embodiment for filling vehicle fuel tanks, escape of the gas during the refuelling operation is reliably avoided when connecting or releasing the rapid connection coupling. This is especially important for protection of the environment, since with the connection couplings in use today a substantial volume of gas is lost in each charging operation, which can escape when coupling up or uncoupling.

In particular, the simple force-free fastening prevents the counter-connection and locking elements, respectively, as well as associated sealings from being damaged by excessive force application or "oblique" fastening. It should be noted that the proposed rapid connection coupling is suitable for various connections, in particular for connection nipples with an external thread. However other profile shapes such as perforations, threads or beads on the connection nipple can be provided for connection of the coupling, the opposed jaw shape being correspondingly formed.

By means of the sealing piston axially movable and telescopic under pressure, reliable engagement at the counter-connection is facilitated, since the shifting of the pressurized annular piston and the axial movement of the sealing piston cause a nearly simultaneous opening of the outlet valve. By means of this interlocking engagement due to the telescopic movement, the corresponding connection nipple, e. g. for a fuel tank, can be of relatively simple construction and nevertheless because of the slight ability of the sealing piston to move axially even when the jaws are locked, the rapid connection coupling engages reliably in the connection profile of the connection nipple. In addition, excessive wear or damage to the connection profile both on the coupling side and the nipple side is reliably avoided by means of the nonreacting disconnection and a cheap, simple construction of the counter-connection (connection nipple) is achieved.

BRIEF DESCRIPTION OF THE DRAWINGS

An embodiment will be described and explained in more detail below with reference to the accompanying drawings, in which.

DETAILED DESCRIPTION OF THE INVENTION

Figure 1:
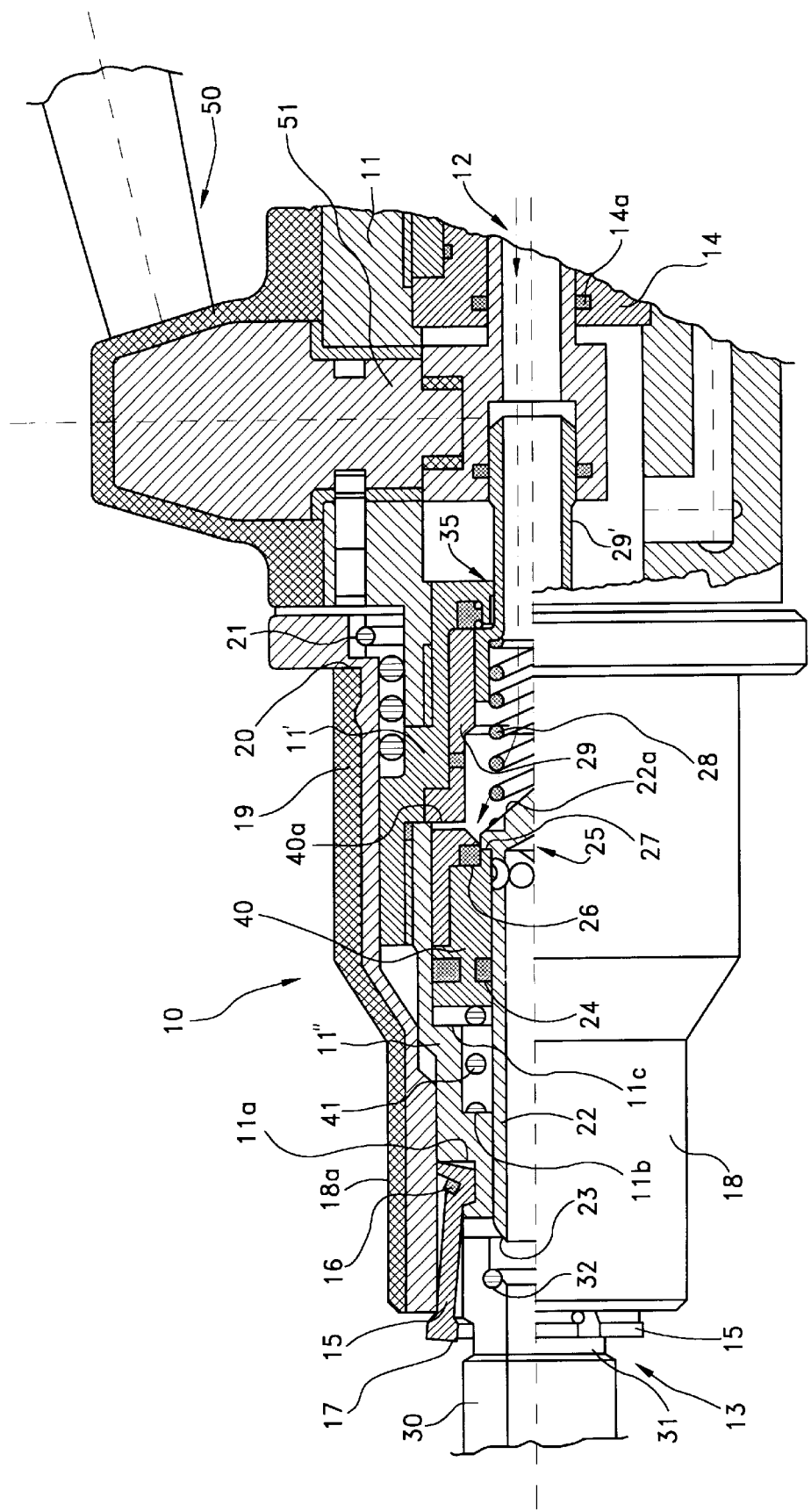
FIG. 1 is a side view of a rapid connection coupling for a connection nipple with a connection profile, wherein the rapid connection coupling is shown in longitudinal half section and in the position shortly before connection.

A preferred embodiment of a rapid connection coupling 10 is shown in FIG. 1, shortly before the connection to a connection nipple 30. The rapid connection coupling 10 comprises a tubular housing 11 with several threaded housing parts 11' and 11", where the right end here serves as the inlet 12 and the left end as the outlet 13 for feeding on the fluid to be transferred to the connection nipple 30. The inlet 12 to the housing 11 has a connection adaptor 14, which is screwed into the housing 11 and is sealed relative to the housing 11 by a seal 14a. The connection adaptor 14 comprises f. i. a thread (not shown) at its end here on the right, to which a hose or a pipeline for supplying the fluid can be connected. The connection adaptor 14 can be designed to match the fluid to be transferred, especially the currently desired feed angle, through-flow cross-section, etc.

On the outlet end opposite the connection adaptor 14, there are provided several elongated jaws 15 arranged in tubular form and which are radially spread in the position shown here shortly before plugging on to the connection nipple 30, as is also shown in the previously recited WO-A 93/20378 for example. The elongated jaws 15, of which at least three and in general six of those jaws 15 are arranged around the front housing part 11", are hooked in an annular groove 11a of the housing part 11" at their ends here on the right and are biased by an annular spring 16 so that the jaws 15 are spread radially. At the end here to the left, on the inwardly offset surface, the jaws 15 each have an interlocking engagement profile 17 formed in correspondence with a groove-shaped connection profile 31 of the connection nipple 30, so that in the design with an external thread on the connection nipple 30, a correspondingly formed inner thread is opposed on the radially inwardly directed surfaces of the engagement profile 17.

An outer sliding sleeve 18 tapered towards the connection nipple is provided around the jaws 15 and is guided on the cylindrical outer surface of the housing part 11' and is biased by a compression spring 19 in the direction away from the connection nipple 30. The compression spring 19 abuts a step of the housing part 11' via an abutment ring 20 and a circlip 21 and thus moves the sliding sleeve 18 to a control or actuation lever 50 with an eccentric shaft 51. The structure thereof is described in more detail in the above-mentioned prior art such that a further description may be omitted here.

A hollow sealing piston 22 is guided on the inner peripheral surface of the housing part 11" disposed towards the outlet 13 and comprises a conically-formed sealing surface 23 at its front end for engagement with a sealing ring 32 of the connection nipple 30. The sealing piston 22 is sealed relative to the outer parts by means of an inserted sealing ring 24, so that the gaseous and/or liquid fluid flowing essentially along the central axis of the rapid connection coupling 10 cannot escape to the outside.

Furthermore, an outlet valve 25 provided at the front side of the sealing piston 22 is of great importance and is sealed relative to a sealing surface 27 on sealing piston 22 by means of a sealing ring as valve-seat 26 in the closed position. This outlet valve 25 is biased by a compression spring 28, which is guided by an insert 29 and abuts the housing part 11'. Through this outlet valve 25 it is ensured that the fluid fed through the connection adaptor 14 cannot flow out in the uncoupled position or just before the connection of the rapid connection coupling 10 to the connection nipple 30, as shown here.

The outlet valve 25 has a surrounding ring piston 40 which on plugging the rapid connection coupling 10 on to the connection nipple 30, cooperates with the sealing piston 22, whereby the latter is pressed in along the connection nipple axis on attachment and hereby takes a retracted position allowing a force-free fastening to the counter-connection. The outlet valve 25 of the rapid connection coupling 10, being closed in this position, is further opposed by a stem 29' inserted in the insert 29, which on the one hand, serves to guide the compression spring 28 exactly and together with a step of the insert 29, forms a ventilation valve 35. This ventilation valve 35 also controlled by the eccentric shaft 51 serves for pressure reduction on decoupling.

Of particular importance is the ring piston 40 which is guided on the outer periphery of the sealing piston 22 and is biased by a compression spring 41. The compression spring 41 abuts a shoulder 11b of the housing part 11". As can be seen from the illustration in FIG. 1, the ring piston 40 is urged by the compression spring 41 against the inwardly offset region of the insert 29, whereby a stop to the sliding movement of the ring piston 40 on the sealing piston 22 is also effected, as the annular surface 40a (directed to the inlet 12) of the ring piston 40 contacts this step. Since the sealing piston 22 can slide axially into the opposed recess of the connection nipple 30, a certain capacity is provided between the ring piston 40 and the sealing piston 22 for relative axial movement of these two components.

Figure 2:
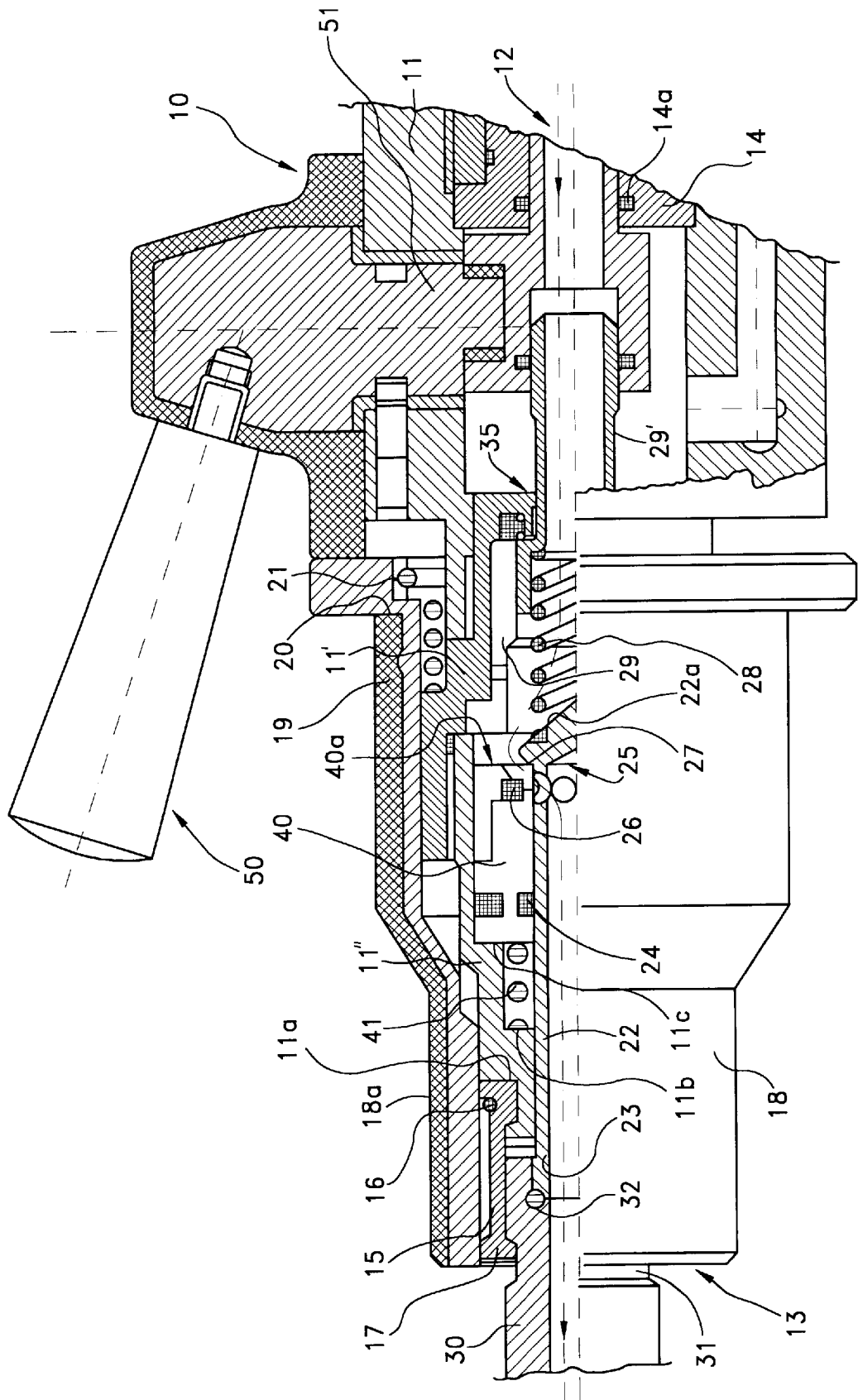
FIG. 2 is a similar view of the rapid connection coupling in the connected position on the connection nipple.

The connected position of the rapid connection coupling is shown in FIG. 2. As can be seen, on plugging the rapid connection coupling 10 on to the connection nipple 30, the engagement profile 17 of the jaws 15 is brought into engagement with the connection nipple 30. Actuation of the control lever 50 (preferably turning round approximately 90 to 180°) moves the sliding sleeve 18 over the jaws 15 thus locking them. The sliding sleeve 18 may be provided with a rubber or plastics casing 18a to prevent adjacent vehicle parts from being damaged. On pressurization (start of refuelling operation) the sealing piston 22 is moved to the left together with the ring piston 40 with the support of the spring 28 and against the tension of the compression spring 41, because the pressure is applied on a rather large annular surface 40a of the ring piston 40. On abutment of the sealing ring 32 at the sealing surface 23, the ring piston 40 is further displaced and the valve seat 26/27 of the sealing piston 22 is opened, too, until the ring piston 40 comes into contact with the shoulder 11c projecting from the outer periphery. Thus, after a small movement of a few millimeters, the valve seat 26 abutting the inner surface of the ring piston 40 is freed from its blocked position. Meanwhile, the engagement profile 17 has already engaged the correspondingly formed connection profile 31 of the connection nipple 30, wherein by virtue of the axial movement of the sliding sleeve 18, the latter engages over the radially outer ends of the jaws 15, so that they are retained interlocked in their engaged position an the connection nipple 30.

It should be noted that in the connected position here shown in FIG. 2, the sealing piston 22 is still axially movable relative to the ring piston 40 and is also pressed on the sealing ring 32 by the compression spring 28. It is of significant importance that there is an annular surface 22a, which has a greater effective area than in the region of the contacting surface between the sealing ring 32 and the sealing surface 23. Through this it is ensured that, with fluid flow as shown in broken lines substantially along the central axis of the rapid connection coupling 10, the sealing piston 22 with its sealing surface 23 is pressed even more strongly against the sealing ring 32 as the pressure increases. This provides a servo-action, i. e. a stronger force of application of the sealing ring 32 with increasing fluid pressure and thus a particularly reliable sealing of the rapid connection coupling 10.

In order to release the rapid connection coupling 10 and thus return to the open position according to FIG. 1 from the attached position according to FIG. 2, the sliding sleeve 18 is retracted by means of the compression spring 19 after turning the control lever 50. After a short movement the jaws 15 can again spread radially. Furthermore, by the effect of the compression spring 41, the ring piston 40 is urged here to the right toward the inlet side 12, as the annular surface 40a is not pressurized any longer, since fluid pressure had been interrupted before (f. i. by closing a fuel and inlet valve and opening the ventilation valve 35).

The design of the ring piston 40 is especially important to this, since it avoids damage to the engagement profile 17 or the connection profile 31 and allows the rapid connection coupling 10 to be plugged on or uncoupled from the connection nipple 30 in a secure and force-free manner. This axial displaceability of the sealing piston 22 and its entrainment by the ring piston 40 derived therefrom in direct sequence allows practically force-free performance of the connection or disconnection operation.

What is claimed is:

1. A rapid connection coupling for transferring gaseous and/or liquid fluids, comprising:

a tubular housing;

an outer sliding sleeve slidably mounted relative to the housing;

a plurality of locking elements attached to the housing and movable radially, the locking elements having an engagement profile for connection to a correspondingly formed connection nipple;

a sealing piston centrally slidable in the housing for engagement on the connection nipple; and a spring-biased ring piston axially displaceable in the housing, the spring piston configured to hold the sealing piston in a retracted position and to be displaceably seated relative to the sealing piston.

2. The rapid connection coupling of claim 1, wherein the locking elements include spreadable jaws.

3. The rapid connection coupling of claim 1, further comprising a common compression spring configured to act on the sealing piston and the ring piston.

4. The rapid connection coupling of claim 1, further comprising at least one sealing ring provided between the sealing piston and the ring piston.

5. The rapid connection coupling of claim 1, wherein the sealing piston is configured to be guided on inner surfaces of the housing and of the ring piston.

6. The rapid connection coupling of claim 1, wherein an annular surface of the sealing piston, directed to the fluid, has a greater effective surface than an axially opposed sealing surface.

7. The rapid connection coupling of claim 1, wherein the ring piston comprises an annular piston surface surrounding the sealing piston and being directed towards an inlet.

8. The rapid connection coupling of claim 1, further comprising an outlet valve having a valve seat arranged within the ring piston, the outlet valve configured to be opened on pressurization with displacement of the ring piston.

9. The rapid connection coupling of claim 1, wherein an axial displacement of the ring piston is greater than an axial stroke of the sealing piston.

10. The rapid connection coupling of claim 1, wherein the ring piston is a two-part piston.

11. The rapid connection coupling of claim 1, wherein the sliding sleeve is tapered toward an outlet.

12. The rapid connection coupling of claim 1, wherein the sliding sleeve is surrounded by a protective casing made from rubber or plastics.

13. The rapid connection coupling of claim 2, further comprising a common compression spring configured to act on the sealing piston and the ring piston.

14. The rapid connection coupling of claim 13, further comprising at least one sealing ring provided between the sealing piston and the ring piston.

15. The rapid connection coupling of claim 14, wherein the sealing piston is configured to be guided on inner surfaces of the housing and of the ring piston.

16. The rapid connection coupling of claim 15, wherein an annular surface of the sealing piston, directed to the fluid, has a greater effective surface than an axially opposed sealing surface.

17. The rapid connection coupling of claim 16, wherein the ring piston comprises an annular piston surface surrounding the sealing piston and being directed towards an inlet.

18. The rapid connection coupling of claim 17, further comprising an outlet valve having a valve seat arranged within in the ring piston, the outlet valve configured to be opened on pressurization with displacement of the ring piston.

19. The rapid connection coupling of claim 18, wherein an axial displacement of the ring piston is greater than an axial stroke of the sealing piston.

* * * * *